Patented Oct. 31, 1939

2,178,149

UNITED STATES PATENT OFFICE 2,178,149

BEARING COMBINATION

Randolph L. Strickland, Detroit, Mich., assignor to Detroit Aluminum & Brass Corporation, Detroit, Mich., a corporation of Michigan Application December 19, 1938, Serial No. 246,543

4 Claims. (Cl. 308—237)

This invention relates to bearing combinations, such as those including a shaft member and a bearing.

A known type of bearing for shafts consists of a soft liner member on a hard backing. The liner member conforms itself to minute variations in contour of the shaft during the running-in period and also absorbs particles which may be found in the normal clearance between the shaft and the bearing.

A disadvantage of such bearings is that the liner members have a tendency to crack under load.

One object of the invention is to provide a bearing combination in which this cracking tendency is reduced without impairment of the tendency of the liner member to conform to the shaft or to absorb particles. This object I attain by providing a skin on that surface of the liner member which is near the shaft member. The characteristics of the skin will be described below.

Other objects and features of the invention will be brought out in the following description and claims.

Figure 2:
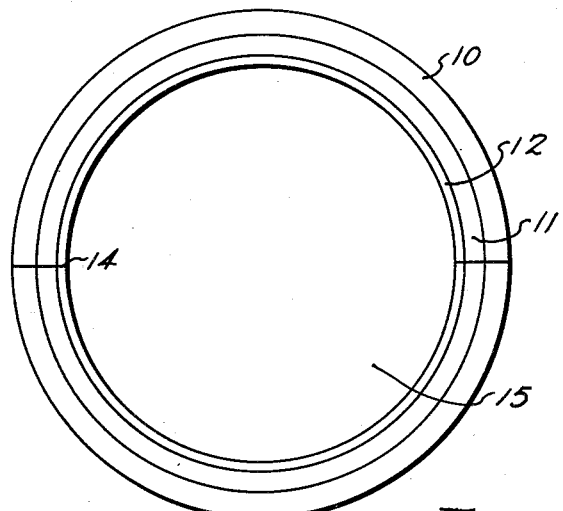
Fig. 2 shows two halves of a cylindrical or sleeve type bearing assembled.
Figure 1:
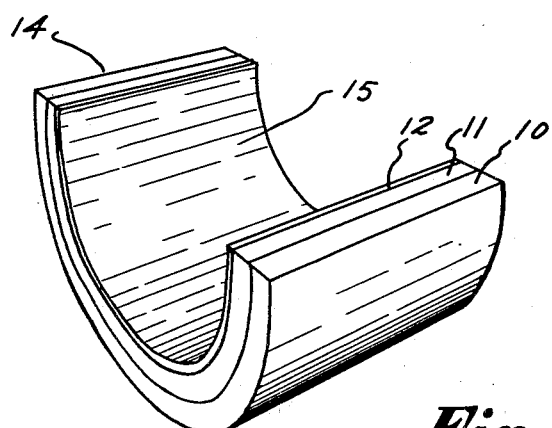
Fig. 1 shows one half of a cylindrical sleeve type bearing of my invention.

The drawing shows a sleeve type bearing consisting of two halves, each comprising a hard backing 10, a soft liner member 11, and a skin 12. The halves meet on lines 14 to define space 15 in which may rotate a shaft member, not shown. In the bearing shown, the backing is of hard steel, and the liner member is a soft alloy, such as cadmium base babbitt.

The present known characteristics and requirements of this skin are as follows: First, it retards cracking of the liner member. Second, it has a lesser tendency to crack than does the liner member. Third, it does not impair the tendency of the liner member to conform to minute variations in contour of the shaft member. Fourth, it does not prevent particles from escaping from the normal clearance between the bearing and the shaft member.

I have found metal to be satisfactory for the skin.

I have also found that of the metals, chromium, copper, or nickel are particularly suitable for the skin. In the bearing shown, copper is used for the skin.

I have found, as satisfactory for the skin, an alloy coating or a copper-nickel coating comprising a thickness of copper and a thickness of nickel. I have found that the skin may well be formed of a plurality of layers of one or more of these or other metals. I have also found that the skin may be formed on the lining in any suitable manner, such as dipping, spraying, plating, fusing, high pressure, etc. I have also found that annealing, to form an alloy between the liner member and the skin, has proven desirable.

I have also found that in some instances particles escape from the normal clearance by penetrating the skin, but without cracking it, so as to be embedded, wholly or partially, within the liner member, and in some other instances the particles escape from the clearance by forming cavities or pockets in the liner member and seating themselves therewithin, the cavities or pockets being indented into the liner member.

I have found that the skin, to be satisfactory, must be thick enough so that it will function to lessen the tendency of the liner member to crack under load and yet be thin enough to permit the particles to penetrate it or indent it to the extent indicated. I have found that if the skin be too thin, it will not be crack-free, nor will it lessen the tendency of the liner member to crack; on the other hand, if too thick, the skin will not be penetrable nor indentable by the particles that are found in the normal clearance between the shaft member and bearing.

As examples of what I have found to be suitable bearings I give the following examples:

(1) The backing was of low carbon steel, 2 inches in diameter, .037 inch thick;

(2) The liner member was .015 inch thick and (a) a babbitt of 3% copper, 7% antimony, and 90% tin; (b) a babbitt of 1.3% nickel, 98.7% cadmium;

(3) The skin was of pure copper, .00005 inch thick; it was applied by electroplating, using a current density of 15 amperes per square foot in a cyanide solution for approximately two minutes.

The bearing shown is in conformity with the foregoing.

Now having described a bearing which embodies my invention, I present the following claims which define my invention.

I claim:

1. A bearing consisting of three integrally united layers, the outer ones being a supporting layer and a bearing layer, respectively, the supporting layer being of hard metal, the intermediate layer being of a soft readily conformable particle absorbing bearing metal, and the bearing layer being a very thin hard coating or skin which prevents cracking of the intermediate layer.

2. A bearing consisting of three integrally united layers, the outer ones being a supporting layer and a bearing layer, respectively, the supporting layer being of hard metal, the intermediate layer being of a soft readily conformable particle absorbing bearing metal, and the bearing layer being a very thin hard coating or skin which prevents cracking of the intermediate layer and which is hard enough to resist cracking.

3. A bearing consisting of three integrally united layers, the outer ones being a supporting layer and a bearing layer, respectively, the supporting layer being of hard metal, the intermediate layer being of a soft readily conformable particle absorbing bearing metal, and the bearing layer being a very thin hard coating or skin which prevents cracking of the intermediate layer and which is thin enough to permit particles to be absorbed by the intermediate layer.

4. A bearing consisting of three integrally united layers, the outer ones being a supporting layer and a bearing layer, respectively, the supporting layer being of hard metal, the intermediate layer being of a soft readily conformable particle absorbing bearing metal, and the bearing layer being a very thin hard coating or skin which prevents cracking of the intermediate layer and which is hard enough to resist cracking and which is thin enough to permit particles to be absorbed by the intermediate layer.

RANDOLPH L. STRICKLAND.